US010621163B2

(12) United States Patent
Hostetter et al.

(10) Patent No.: US 10,621,163 B2
(45) Date of Patent: Apr. 14, 2020

(54) TRACKING AND REUSING FUNCTION RESULTS

(71) Applicant: Facebook, Inc., Menlo Park, CA (US)

(72) Inventors: Mathew James Hostetter, Palo Alto, CA (US); Basil Clark Hosmer, Belmont, CA (US); Aaron Orenstein, Billerica, MA (US)

(73) Assignee: Facebook, Inc., Menlo Park, CA (US)

( * ) Notice: Subject to any disclaimer, the term of this patent is extended or adjusted under 35 U.S.C. 154(b) by 204 days.

(21) Appl. No.: 15/835,331

(22) Filed: Dec. 7, 2017

(65) Prior Publication Data
US 2019/0179932 A1    Jun. 13, 2019

(51) Int. Cl.
*G06F 17/00* (2019.01)
*G06F 16/23* (2019.01)

(52) U.S. Cl.
CPC .............. *G06F 16/2365* (2019.01)

(58) Field of Classification Search
CPC .................................. G06F 16/2365
USPC ................................. 707/600–899
See application file for complete search history.

(56) References Cited

U.S. PATENT DOCUMENTS

2017/0171075 A1* 6/2017 Sajeepa ............... H04L 45/745

OTHER PUBLICATIONS

Acar, U., et al., "An Experimental Analysis of Self-Adjusting Computation," ACM Transactions on Programming Languages and Systems, vol. 32, No. 1, Article 3, Oct. 2009, 53 pages.
Acar, U., et al., "Self-Adjusting Computation," Carnegie Mellon University, May 2005, 299 pages.
Acar, U., et al., "Traceable Data Types for Self-Adjusting Computation," PLDI, Jun. 5-10, 2010, 14 pages.
Acar, U., et al., "Adaptive Functional Programming," Carnegie Mellon University, May 2006, 46 pages.
Burckhardt, S. et al., "Two for the Price of One: A Model for Parallel and Incremental Computation," OOPSLA, Oct. 22-27, 2011, 18 pages.
Hammer, M. et al., "ADAPTON: Composable, Demand-Driven Incremental Computation," PLDI, Jun. 9-11, 2014, 11 pages.
Ley-Wild, R. et al., "Compiling Self-Adjusting Programs with Continuations," ICFP, Sep. 22-24, 2008, 13 pages.

* cited by examiner

*Primary Examiner* — Isaac M Woo
(74) *Attorney, Agent, or Firm* — FisherBroyles, LLP

(57) ABSTRACT

Embodiments for tracking stored function results are described. Results of function executions can be stored so that when the function is invoked again with the same arguments, the stored results can be used instead of re-executing the function. However, using a stored function result, instead of re-executing the function, can only be done safely when data sources used in the function execution have not changed since a previous function execution of the current function invocation. The function result tracking system disclosed herein can correlate, with function executions, one or more timeframes for which results of that function execution are valid. For example, each node referenced in a trace can represent a function execution and each node can be associated with a data structure that keeps track of results of function executions, and timeframes for when those results are valid or invalid.

20 Claims, 7 Drawing Sheets

TRACKING AND REUSING FUNCTION RESULTS

BACKGROUND

As both the diversity of actions that can be performed by computing systems and the number of processing requests for each of these actions increase, there is an ever greater demand for processing bandwidth. Furthermore, when function calls are part of client-side processing, function executing can require transferring code for that function to the client, or function calls can be across a network, with results sent back to the calling system (e.g. in a callback). These transfers takes up valuable network bandwidth and delay processing response time until the data or code can be delivered.

Due to the sheer volume of functions to be executed, especially in large distributed applications such as social networking platforms, various latencies can be experienced due to the data and instruction retrieval process. These latencies can make the computing systems appear to be sluggish, and users may simply elect to use a different service. For example, some social networking sites have attracted billions of active users, all sharing links, requesting content, and sending messages. At any given time, millions of content requests can occur contemporaneously, e.g. when users visit various pages or open a feed on their social media app. Sometimes these requests repeatedly make the same function calls with the same arguments.

There have been some systems which attempt to reuse function results by storing a bit for the stored result of a function invocation to indicate whether the result is still valid. In some cases, however, the same results cannot necessarily be expected because source data (e.g. global state variables, results of other functions, or other data) changes. Using just a validity bit, the invoked function is unable to determine whether the change affects results for particular function invocations; thus a function result can be marked invalid, even when a stored result can be used in some circumstances. Therefore, in prior art systems, stored previous function results are often wasted, causing unnecessary re-execution of the code or re-obtaining data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
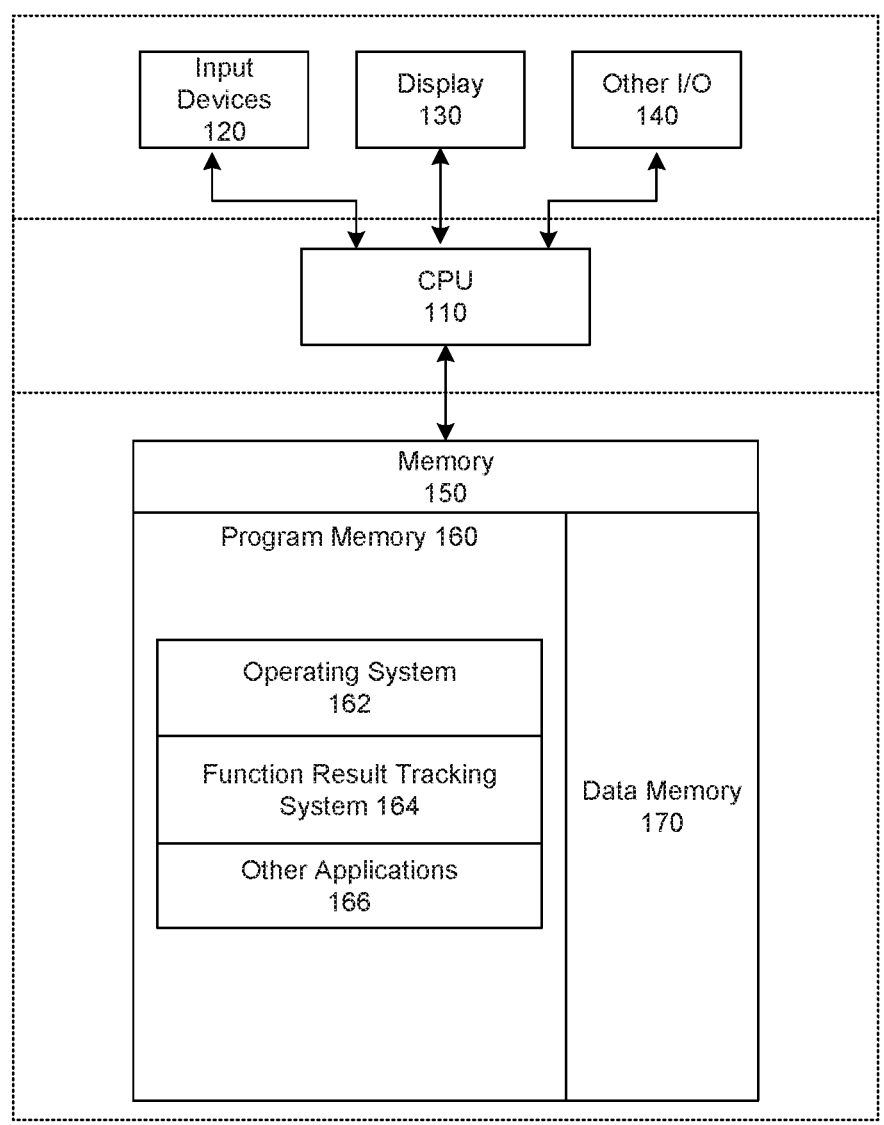
FIG. 1 is a block diagram illustrating an overview of devices on which some implementations can operate.

Embodiments for tracking and reusing stored function results are described. When a computing system executes software, it often makes calls to various "functions" (also known as methods, sub-routines, etc.) to carry out operations. Functions allow the same code to be employed multiple times, with the same or different arguments. In some cases, the result of a function can be stored so that when the function is invoked with the same arguments as a previous execution of the function, the stored results can be used instead of re-executing the function. Sometimes, however, when a function is re-executed, even with the same arguments as a previous execution, it can produce a different result. This is because, when software functions are executed, results of the function can rely on "source data," e.g. data from various sources other than function arguments, such as calls to other functions ("source functions"), global variables or other variables that are in scope to the executed function, data retrieved from databases, etc. Thus, using a stored function result, instead of re-executing the function, can be done safely only when these other data sources have not changed in the time between the previous function execution and the current function invocation.

As used herein, "executing" a function entails processing the instructions that make up the function, e.g. without using stored results of the function to produce the function result. As also used herein, "invoking" a function entails making a call to the function to obtain a valid result of the function, whether or not that result is obtained by executing the function or by obtaining a stored result of a previous execution of the function. As further used herein, a function that uses other source data is referred to as "depending" on that source data. For example, a function that calls a source function is referred to as depending on that source function.

Some systems can track what source data a function uses in a trace. For each function invocation, with a specified set of zero or more arguments, an invocation node can be created with a trace comprising an ordered list of dependencies ("edges") to source nodes, each representing source functions or other source data, directly or indirectly used during execution of the invoked function. Thus, a sequence of dependencies can exist between various nodes, where the dependencies are defined by trace edges for one invocation node leading to source nodes, which in turn are invocation nodes in one or more other traces. In some implementations, the system can also track reverse pointers to easily determine, for any given source node, which invocations depend on that given source node.

Each node can represent a group of one or more functions (with corresponding arguments) or can represent a mutable data source such as a database row or a global variable. While nodes are discussed below as corresponding to a single function or data source, in some implementations, a node can correspond to a chain of multiple functions that all get called during an execution. Thus, when creating a function trace (referred to herein as "memoizing" the function) a function n( ) may invoke a non-memoized function m( ) (i.e. a function which does not have a corresponding trace). Instead of such a call resulting in an n( )→m( ) edge, the node for n( ) can inherently include the call to m( ).

However, if non-memoized m( ) went on to call memoized function p( ), an n( )→p( ) edge is added to n( )'s trace to record this dependency.

A set of nodes, interdependent through a set of traces, can be used when evaluating a function invocation to determine if there is a valid stored result. In some implementations, this is accomplished by having nodes associated with a validity bit, which will be set to invalid when source data the node uses changes in value. These changes can propagate up the trace dependencies, such that when a value for a source node changes, and its validity bit is set to invalid, a stored result of any functions dependent on that source node (i.e. any invocation nodes that have traces with an edge to that source node), are also set as invalid, and so on up the various traces.

However, in some instances, simply propagating invalidity bit settings up the various traces can cause some stored function results to be disregarded when the result is still valid for some function invocations. For example, in a distributed processing system, a first function can be invoked for "version 1." As used herein, a "version" defines a state of available data such that each time a data change is made (e.g. a database value is updated) the version number can be incremented. The invoked first function can use a stored result if it was valid for version 1 or if all the source data, that the invoked first function uses, is unchanged since version 1. However, at version 2, after the first function is invoked but prior to determining a result for the first function, an item of source data for the first function (e.g. a stored result for a second function) can change. If the system only tracks whether a stored result is currently valid or not, setting the stored result of the second function to invalid can cause evaluation of the first function to determine that its stored result is invalid as at least some of its source data has changed, and thus the first function needs to be re-executed. However, since the stored result of the second function was valid for version 1 corresponding to the version for which the first function was invoked, the stored result for the first function is actually a useable result for the version 1 invocation. Thus, when a function is invoked, it can use a stored result if the stored result for the invocation version is valid or if all of the source data that the function uses for that version is valid, even if that stored function result subsequently becomes invalid. In addition, using a single validity bit also reduces the system's ability to evaluate the world at a particular version while changes are still happening (i.e. the version is incrementing). Conventional solutions to this problem lock the entire series of interrelated traces until all updating computation is complete, then release the lock and apply pending changes, but that solution reduces scalability and performance.

The function result tracking system disclosed herein can correlate, with function executions, one or more "timeframes" for which results of that function execution are valid. As used herein, a timeframe is a range of versions. For example, each node referenced by a series of trace dependencies can represent a function execution performed with a particular set of zero or more arguments. Each node can be associated with a data structure, such as a linked list ("LL"), that keeps track of results of function executions, and timeframes for when those results are valid. For example, a node can be an object with a linked list member variable. While the data structure for tracking valid/invalid function result timeframes is discussed herein in relation to a linked list, other data structures (e.g. arrays, stacks, vectors, etc.) can also be used and are contemplated for this purpose. All or some of the most recent result items in the linked list can also be associated with edges in the trace, indicating which functions or other source data was used to generate the result stored in that linked list item. Each item in the linked list can have a result and can specify a version or a timeframe. In some implementations, a linked list item can indicate that starting at the indicated version, up to but not including the version indicated by the next item in the linked list, the corresponding result is valid. When the list item is at the head of the linked list (i.e. there is no next linked list item), it can indicate that the head item on the linked list is valid for all versions greater than the indicated version (referred to as "timeframe t→∞"), until another item is added to the linked list. In some implementations, an item on a linked list can indicate a version but not a result value or can have a special "invalid" result value. This type of linked list item can indicate that, starting at the indicated version, there is no valid stored result for the function. In some implementations, a linked list item can specify both a start and end version for which the result for that timeframe is valid.

As a more specific example, function f(x, y) can be called, as f(2, 'a'), with version t=50. Execution of this function can call source functions g(2) and then h( ). The g(i) and h( ) function calls can produce results r of g(2)=15 and h( )=5, and using these values in order, f(2, 'a')=18. A resulting trace can have two ordered edges, the first specifying an invocation node for f(2, 'a') pointing to source node g(2) and the second also specifying the f(2, 'a') invocation node with source node h( ). The linked list corresponding to the f(2, 'a') node can have a single item for <t=50, r=18>, indicating that, until another item is added to the linked list, from version 50 onward, the result 18 is valid. In this example, only the most recent linked list item is associated with trace edges. Thus, the <t=50, r=18> linked list item can be associated with the trace having edges from the f(2, 'a') invocation node to the g(2) and h( ) source nodes, and an order among these edges can be saved in the trace. Because each of g(i) and h( ) were executed at version t=50 to get a result, a linked list corresponding to the g(2) node can have a single item for <t=50, r=15> and the linked list corresponding to the h( ) node can have a single item for <t=50, r=5>. Later, at version t=60, f(2, 'a') can be invoked again. The system can look at the linked list corresponding to the f(2, 'a') node, see that it is valid for all version after t=50, and so use the r=18 stored result.

When version indicator t=75, a source data value that the execution of h( ) depended on can change. This causes an item to be added to the linked list corresponding to h( ), to each of the linked lists for the invocation nodes that have a trace edge to h( ) as a source node, and iteratively to each further "ancestor" node up the dependencies between interrelated traces. Here, an item is inserted in the linked lists corresponding to h( ) and f(2, 'a'). Each inserted linked list item can have a value <t=75, r=?>, indicating that from version 75 onward, h( ) and f(2, 'a') don't have a valid stored result. However, the system can then receive a notice that function f(2, 'a') was invoked with version t=70. Because the linked list for f(2, 'a') still has an item indicating a valid result for timeframe 50 to 74, the r=18 result can still be used as a result for the f(2, 'a') invocation for version t=70.

Next, the system can receive a notice that f(2, 'a') was invoked at t=80. In this instance, because the linked list for the f(2, 'a') node has an item indicating there is no valid result from t=75 onward, the system needs to obtain a valid result. In this case, because the invocation version is higher than the version for the most recent valid result, and the system has a trace for the most recent valid result, the system can query each of the source nodes indicated in the trace to see if they have a valid result for t=80. Since the linked list for the g(2) node still has an item <t=50, r=15>, indicating a valid result from t=50 onward, the g(2) node indicates a valid result for version t=80 of r=15. This matches the result that g(2) provided for the invocation corresponding to the most recent valid result for the f(2, 'a') node. The linked list for the h( ) node doesn't have a linked list item indicating a valid result for t=80, so one is obtained for h( ), in this case re-executing the h( ) code with the t=80 version of the source data. In this example, the re-execution produces a result r=5, matching the result that h( ) provided for the invocation corresponding to the most recent valid result for the f(2, 'a') node. Because both data sources for the f(2, 'a') have not changed, a new item can be added to the linked list for the f(2, 'a') node with a valid time that is the intersection of the valid versions of all the source data used by f(2, 'a'), in this case, the intersection is t=80 onward, and a result matching the previous valid result, i.e. <t=80, r=18> is added to the linked list for the f(2, 'a') node. The result for t=80 can also now be used as a result of the invocation of f(2, 'a') for t=80. However, if any of the source data for the f(2, 'a') function had not matched the previous invocation or the invocation was for a version where the previous valid linked list item did not store dependency data, the f(2, 'a') code would have to be re-executed to get a result for the t=80 invocation.

Function result tracking and utilization can include sophisticated technical algorithms and data structures for determining dependencies, tracking result validity, and efficiently re-computing invalid results. Functions can be associated with both data dependency structures and timeframe validity data structures. Navigating these data structures can include deciding whether to select a valid stored result, determining if a result marked invalid should be updated to be valid, or re-execute the function completely. Correctly invoking such a function requires significant technical detail. However, the disclosed technology does so in a manner that provides significant improvements over prior art systems in both processing speed and network bandwidth utilization. These benefits are the direct result of the disclosed technology requiring less code execution to produce a correct result. Where some prior art systems can track the current validity of stored function results, the disclosed technology, by tracking timeframes of validity for various results of an execution of a function, stored results can be reused more often. When a stored result is reused, the processing cycles that would have otherwise been needed to compute a result are saved. Furthermore, when the processing is done by a system remote from the source of the code or where the codes is processed by one system and the result is transferred to a remote system, having a stored result already at that remote system can limit the amount of network bandwidth required to invoke a function.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can track and use stored function results. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, function result tracking system 164, and other application programs 166. Memory 150 can also include data memory 170 that can include traces, function result and validity data structures, a version counter, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
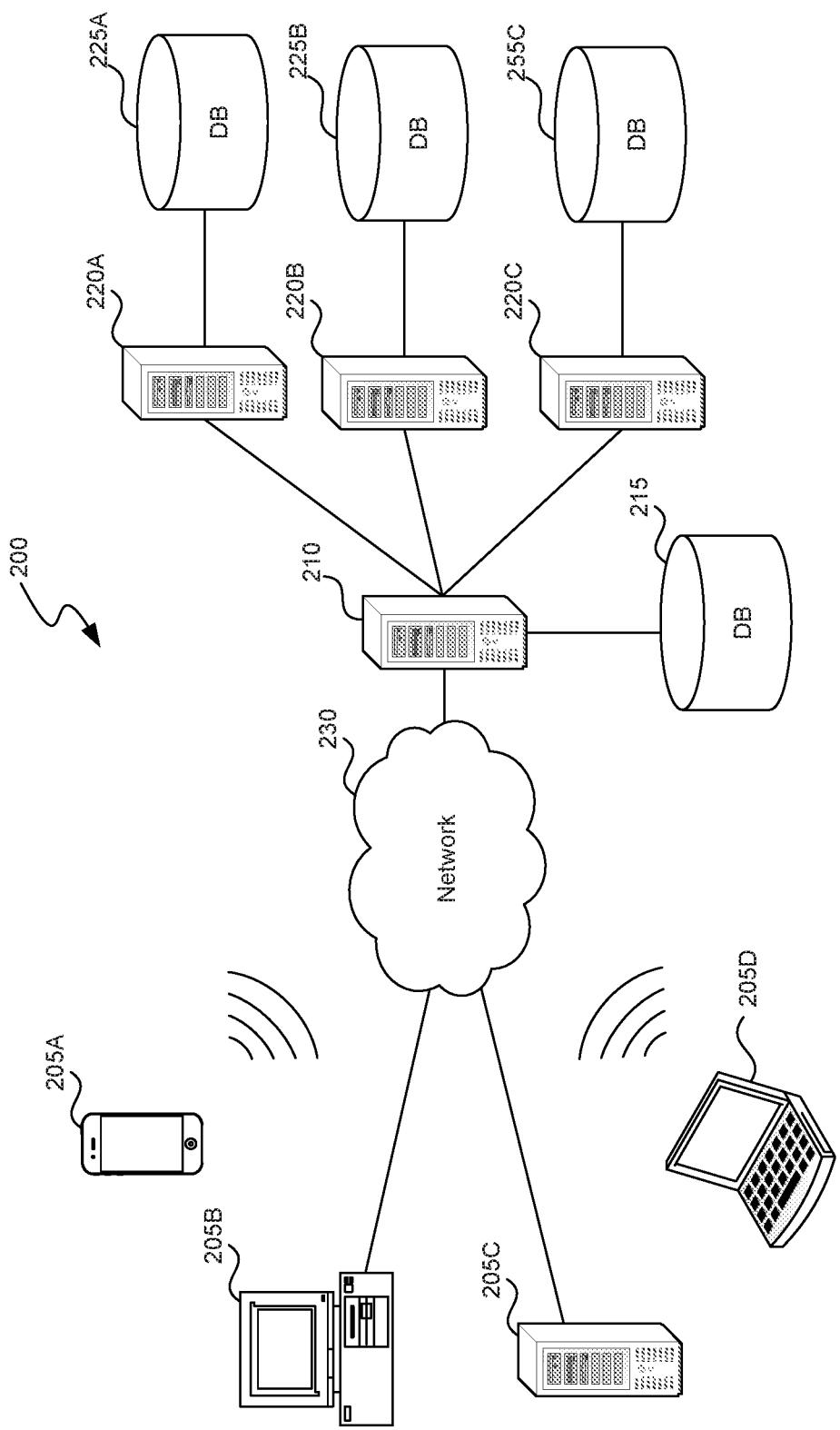
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as function results, dependency data, function code, processing statistics, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
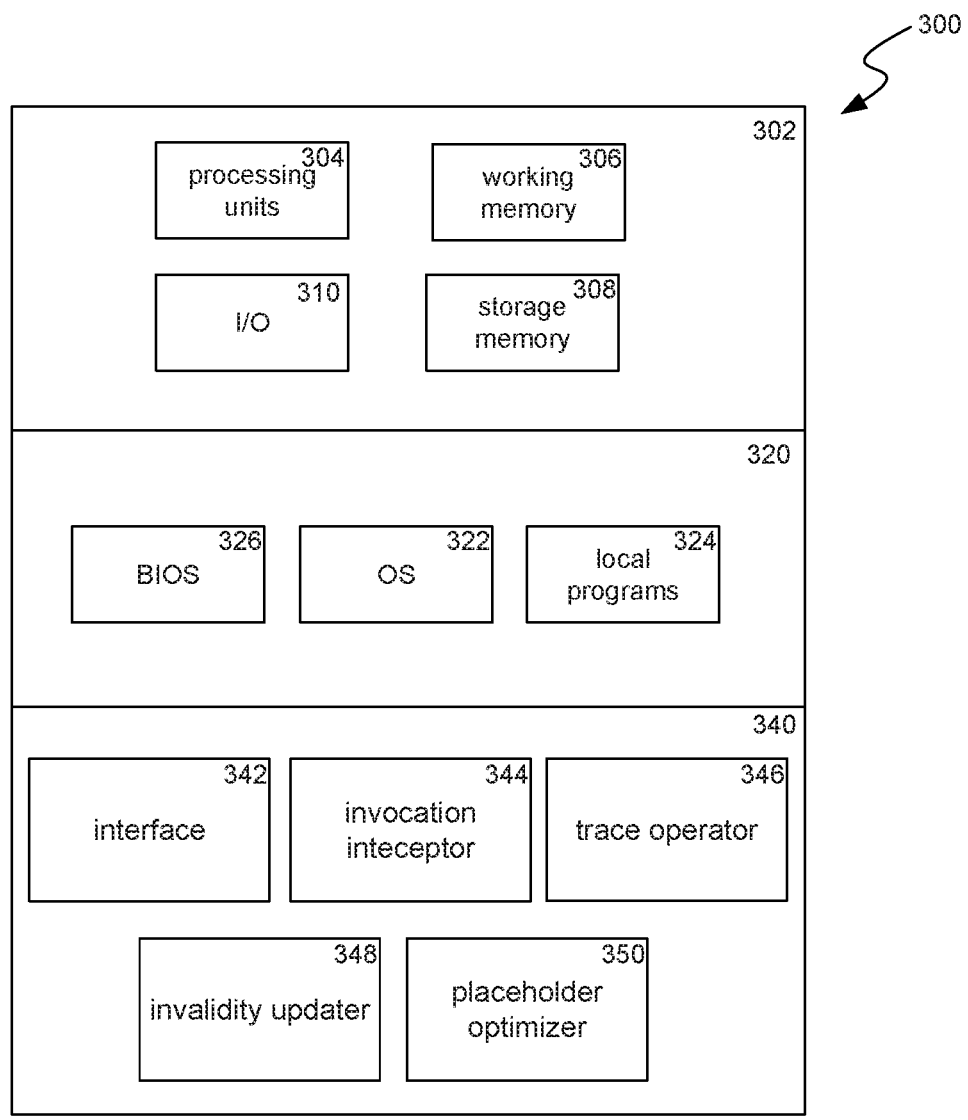
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include invocation interceptor 344, trace operator 346, invalidity resolver 348, placeholder optimizer 350, and components which can be used for transferring data and controlling the specialized components, such as interface 342. In some implementations, components 300 can be in a computing system that is distributed across multiple computing devices or can be an interface to a server-based application executing one or more of specialized components 340.

Invocation interceptor 344 can obtain an indication that a function has been invoked. Invocation interceptor 344 can be part of a runtime framework that is responsible for responding to function calls. In various implementations, invocation interceptor 344 can be an explicit function called as part of executing another function (e.g. a checkForStoredResult( ) automatically added to the beginning of other function calls) or invocation interceptor 344 can monitor and handle function calls in the background of execution (e.g. as an initial step coded to be performed before retrieving the function code and establishing space on the memory stack for function execution). Invocation interceptor 344 can determine what function was invoked, what arguments were passed to the function, and a version value associated with the invocation. In some implementations, the version value can be a counter (e.g. global variable) that is incremented for each data change, in which case the time value establishes the relative ordering between various states of available data. Invocation interceptor 344 can pass the invocation information to trace operator 346, e.g. directly or through or interface 342.

Trace operator 346 can determine, for a particular function invocation, whether there is a linked list corresponding to the invoked function with the corresponding arguments, and if so, whether that linked list has a valid result value for the version associated with the invocation. Trace operator 346 can also update trace dependencies as functions are executed. Trace operator 346 can further keep updated the validity data in linked lists corresponding to nodes, e.g. as data relied upon by a function changes, to propagate invalidity states up interrelated trace dependencies, and in response to new validity data being determined.

When trace operator 346 receives, from invocation interceptor 344 or interface 342, an indication that a function has been invoked with the details of any arguments used in the function invocation with a version number for the invocation, trace operator 346 can obtain a linked list corresponding to that function invocation with the specified arguments. In some implementations, trace operator 346 can maintain multiple traces and corresponding linked lists, corresponding to various unique function invocations, where a unique function invocation is a function called with a particular set of zero or more arguments. Changing either the function called or a argument provided constitutes a different unique function invocation. Each node can be associated with a linked list or other data structure that stores pairs of A) a version value or time range and B) corresponding function results (or a blank or special indicator if the entry signifies a timeframe for which there are no valid stored function results or placeholder items, as discussed below). In some implementations, items on the linked list can specify a timeframe, starting with the version indicated in the item and continuing until directly before a version indicated by the next item in the linked list, that the corresponding stored function result is valid (or invalid if the corresponding stored function result is blank or uses a invalidity indicator). When the item is at the head of the linked list, the timeframe for that entry can start at the indicated time and go to infinity, until a new item is added to the head of the linked list.

If the linked list for the invoked function indicates, for a timeframe encompassing the function invocation version, that there is a valid stored function result, that function result can be returned without re-execution of the invoked function. If the item on the linked list for the timeframe encompassing the function invocation version indicates that there is no valid stored function result for that version, the function invocation, the version, and the trace (or set of multiple traces) can be passed to invalidity resolver 348. As discussed below, invalidity resolver 348 can determine a valid function result for the invoked function for the invocation version number and signal updates that trace operator 346 should implement to the trace as a result of the processing of invalidity resolver 348.

When a function executes, either initially or in response to the system not having a valid stored function result for a function invocation, trace operator 346 can monitor which other functions are called or other source data is used to determine which source data the executing function is dependent upon, in what order, and what value was provided by each data source. Other called functions that are memoized are other source data nodes referenced by edges in the resulting trace, the dependencies are stored as edges in a trace with an associated order and return value. In various implementations, at trace can be stored for a specified amount of the most recent linked list items (e.g. 1, 2, 5, etc.). In some instances, as discussed below, invalidity resolver 348 can use these traces to resolve invalidities without having to re-execute the invoked function or all of the invoked function's source functions.

Trace operator 346 can further store and update validity data (to mark a timeframe as having a valid result or to not have a valid result) by adding items to the linked lists corresponding to invocations. These linked list items can be added, e.g., to mark a timeframe as invalid as data relied upon by a function changes or to mark a new function result for a timeframe as valid. In some implementations, when source data is changed, the dependencies between traces can be traversed, adding an invalidity item to the linked list corresponding to each of the ancestor nodes of changed source node. As used herein, an "ancestor" of a particular node is any node that is connected to the particular node, through a series of one or more trace edge traversals from a current node as the invocation node to one of that current node's source nodes as a new current node, starting at the ancestor node.

Invalidity resolver 348 can receive, from trace operator 364, an indication that a function invoked for a particular version did not have a stored valid result for that version and can also receive the corresponding linked list and trace(s). Invalidity resolver 348 can determine, for the invoked function, whether, in the linked list, the most recent valid linked list item prior to the invocation version is associated with a trace indicating which data sources were used in the function invocation that created that valid linked list item.

If this trace does not exist, invalidity resolver 348 causes the invoked function to be re-executed. Results of the re-execution can be provided to trace operator 346, which will add a valid item to the linked list for that invocation. This item can be added to the linked list at a location to keep the linked list items in order of the invocation version numbers associated with each linked list item.

If the trace does exist, invalidity resolver 348 can determine whether all the source data has a valid result for the invocation version. If any source data from a stored function result is invalid for the invocation version, invalidity resolver 348 can invoke those functions for the invocation version in the order indicated by the trace, which will be intercepted by invocation interceptor 344, and produce a valid result for the invocation version. Next, invalidity resolver 348 can determine if either A) the invalid source data is from another data source (e.g. a global variable or database) or B) the invocation of a source function produced a result that is different from a previous result produced by that source function, invalidity resolver 348 causes the invoked function to be re-executed and results of the re-execution can be provided to trace operator 346, as discussed above. However, if both A) all the invalid source data was from invalid stored function results and B) the invocation of the source function produced a result that is the same as the previous result produced by that function, then no input to the invoked function has changed. Thus, the previous stored function result is still valid; the linked list can be updated to indicate that, for intersection of the timeframes of the used source nodes, the previous stored result is valid. That previous stored result can also be returned in response to the invocation.

Placeholder optimizer 350 can cause some function invocations, when there is not a stored valid result for a timeframe including the invocation version, to wait for another invocation of the same function to finish before determining how to proceed with the invocation. Placeholder optimizer 350 can take over after trace operator 346 determines that, for a particular function invocation, the corresponding node is not associated with a valid result value for the invocation version. Placeholder optimizer 350 can determine whether, in the linked list for the node corresponding to the invocation, there is already a placeholder item set with a timeframe covering the invocation version. A placeholder item can be a special linked list item that indicates another invocation has begun with a particular invocation version which will produce a valid result for at least that earlier invocation version and possibly additional versions.

If such a placeholder item is in the linked list, placeholder optimizer 350 can pause the received invocation to wait for the result corresponding to the placeholder item. When the result is produced, placeholder optimizer 350 can determine if the result is valid for the invocation version. If so, that result can be used as a result for the invocation.

If there is not such a placeholder item in the linked list or there is such a placeholder item but, after waiting for the result of the result corresponding to the placeholder item, the result does not produce a valid result timeframe including the invocation version, placeholder optimizer 350 can add a placeholder item to the linked list and continue the invocation of the function. When a result of the invocation is produced providing a valid result for a timeframe, the placeholder item can be removed from the linked list.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
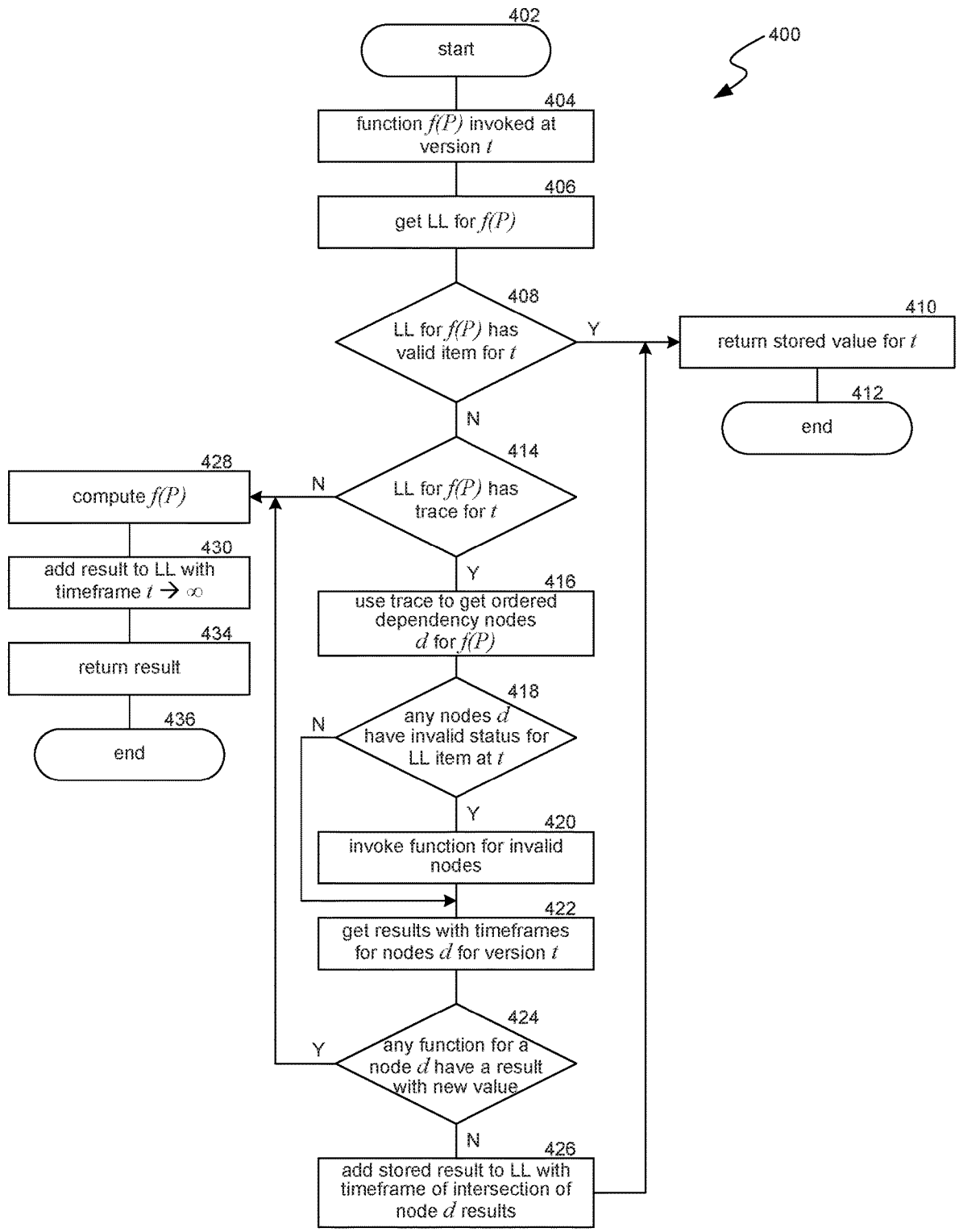
FIG. 4 is a flow diagram illustrating a process used in some implementations for tracking and reusing stored function results.

FIG. 4 is a flow diagram illustrating a process 400 used in some implementations for tracking and reuse of stored function results. Process 400 begins at block 402 and continues to block 404. At block 404, process 400 can receive an indication that a function f( ) was invoked at time t with arguments P; f( ) can be any function, P can be a set of zero or more arguments, and t can be any indicator of data update ordering (e.g. a version number).

At block 406, process 400 can obtain a linked list corresponding to f(P). Other data structures can be used, such as an array of <timeStart, timeEnd, value> items. Some items in a data structure can indicate a timeframe for which there is no stored valid function result. One or more of the items in a data structure can be associated with trace data indicating what source data (e.g. global variables, other function results, database values, etc.) were used during the execution that produced the result value stored by that item. When a source data value changes (e.g. a variable changes, a function result for a corresponding timeframe becomes invalid, or a database write occurs affecting the portion of the database relied upon, etc.), the invocation nodes that are connected by trace edges to nodes for those source data items can also become invalid by adding corresponding invalidating items to their associated data structures.

At block 408, process 400 can determine whether the linked list item, for the timeframe covering the invocation version t, is associated with a valid stored result for f(P). If so, process 400 continues to block 410, where the stored result is returned instead of executing f(P). Process 400 then continues to block 412, where it ends.

If, at block 408, the linked list item for the invocation version t indicates there is no stored valid function result for version t, process 400 continues to block 414. In some implementations, as discussed below, process 400 can implement process 600 at this point instead of proceeding to block 414. At block 414, process 400 can determine whether an item m in the linked list that is directly before the item for the timespan covering version t, is associated with a trace specifying which source data was used to compute that value. If that trace is not available, process 400 can continue to block 428, if that trace is available, process 400 can continue to block 416.

At block 416, process 400 can use the trace to obtain the source nodes d, indicating the source data that the execution of f(P) was dependent upon in the execution corresponding to the linked list item m that has the previous valid timeframe identified at block 414. At block 418, process 400 can determine, in order of edges defined the trace, if, in the linked lists corresponding to each of the d nodes, any of the linked list items that have a timeframe that cover the t invocation version have no valid stored result. Though not shown, process 400 can also determine if any of the source nodes with an invalid result for the t invocation version are from a source other than a function call e.g. a handle on database value or global variable, in which case the f(P) function needs to be re-executed with the new data, thus process 400 would continue to block 428. If so, process 400 continues to block 420, if not (meaning all the source nodes d have a valid result for the t invocation version) process 400 continues to block 422.

At block 420, process 400 can invoke some or all of the functions corresponding to the nodes with no valid stored result, found at block 418. These invocations can be in the order defined by the trace obtained at block 414, i.e. the order in which the corresponding functions were called by f(P). Each of these invocations can initiate new instances of process 400, however, each of those will use invocation version t as the invocation version. These invocations will produce a valid result for each function for at least version t.

At block 422, process 400 can get the valid result for each of the functions corresponding to the d nodes. Each of these results can be accompanied by an indication of a timeframe for which that result is valid, where each of these timeframes will include at least version t.

At block 424, process 400 can iterate through the results obtained at block 422, checking each against a corresponding result produced by that source data in the execution of f(P) corresponding to item m. These iterations can occur in an order of edges defined by the trace for f(P). If any of these source data results are different than they were in the execution for item m, then f(P) needs to be re-executed with the new data, so process 400 continues to block 428. In some implementations, these comparisons can occur immediately after each result is obtained at block 420 and if any result is different from the previous result for that function, process 400 can continue from block 420 to block 428. However, if all of these results are the same as they were in the execution for item m, since the source data has not changed, the value from item m is valid for version t, and process 400 continues to block 426. At block 426, process 400 can update the linked list for the f(P) node to have a stored result with the m result and a timeframe defined by the intersection of the timeframes obtained at block 422. For example, if f(P) called two functions q(7) and r(10), which returned valid results at 422 of q(7)=8 for timeframe 10-20, and r(10)=17 for timeframe 15→ infinity, the intersection of these timeframes would be 15-20. Process 400 then continues to block 410 where the newly added valid stored result for version t can be returned. Process 400 can then continue to block 412, where it ends.

If no trace data was available at block 414, some changed value was not from a function call at block 418, or the valid result for a function for version t was different from the previous value from that function at block 424, process 400 continued to block 428. At block 428, process 400 can re-execute f(P) for version t, not relying on any stored function results, to determine the result of f(P). At block 430, process 400 can add an item to the f(P) node's linked list, where the new item includes the computed result of f(P), with a corresponding version t. This item can be added to the linked list at a location such that the items in the linked list are always in ascending order of their version number. Thus, if t is greater than the last linked list version number, this item is added to the head of the linked list and the timeframe for this item will be from t→ infinity, until another item is added to the linked list.

Process 400 can then continue to block 434 where the result of f(P) computed at block 428 is returned as a response to the invocation. Process 400 then continues to block 436, where it ends.

Figure 5:
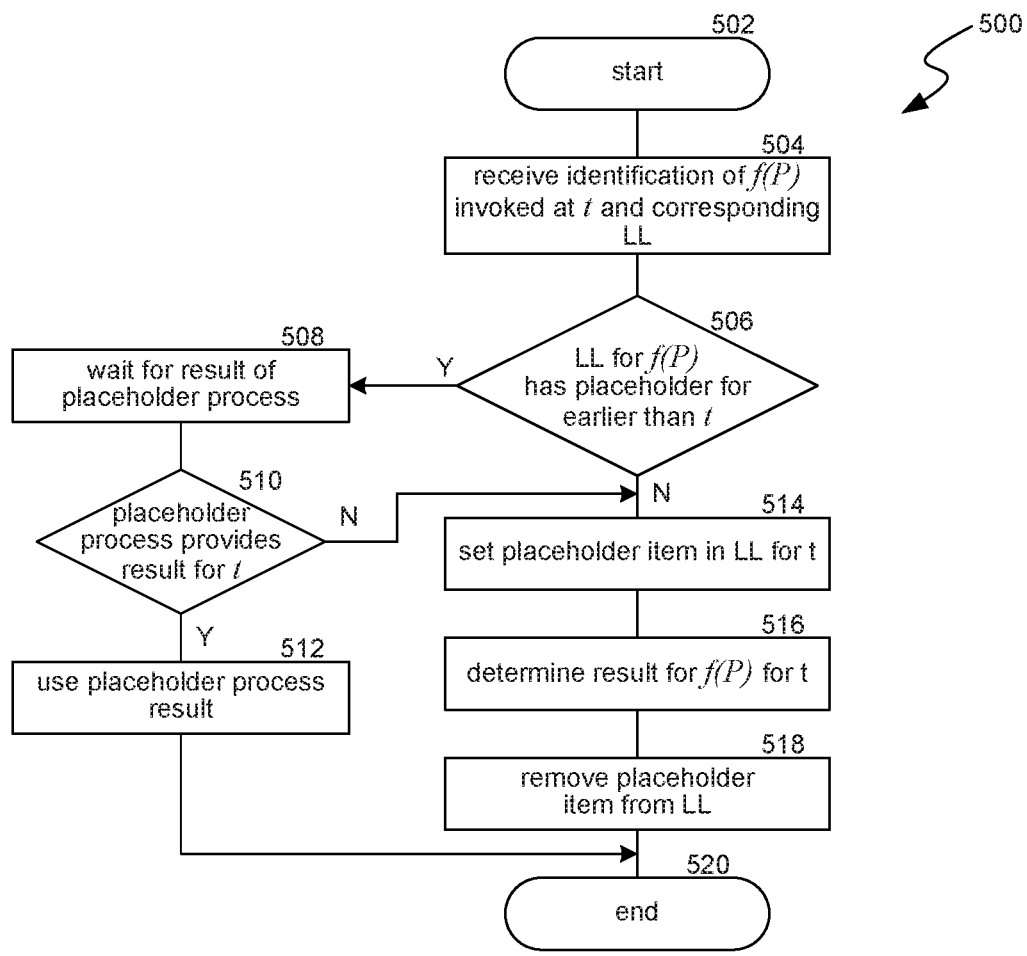
FIG. 5 is a flow diagram illustrating a process used in some implementations for an optimization that uses placeholders to prevent duplicate checking for valid stored function results.

FIG. 5 is a flow diagram illustrating a process 500 used in some implementations for an optimization using placeholders to prevent duplicate checking for valid stored function results. In some implementations, process 500 can be initiated between the blocks 408 and 414 of process 400. Process 500 begins at block 502 and continues to block 504. At block 504, process 500 can receive an identification of a function (referred to here as f( )), invoked for a particular data version (referred to here as t), with particular arguments (referred to here as P). Process 500 can also receive a linked list, corresponding to f(P) invocation, of stored function results with validity timeframes.

At block 506, process 500 can determine whether the received linked list has a placeholder item set for a version with a timeframe that covers t. If so, this indicates that another invocation of the f(P) function is in process, and another version of processes 400 and 500 are determining a valid result for an earlier version. Because that valid result may also be valid for version t, process 500 continues to block 508, where it waits for the result of the other invocation corresponding to the placeholder in the linked list. Once that result corresponding to the placeholder is obtained, process 500, at block 510, can determine whether the result that was valid for the earlier version is also valid for version t. If so, process 500 continues to block 512, where it uses the result corresponding to the placeholder, determined to be valid for version t, as a response to the invocation of f(P). When process 500 is called between blocks 408 and 414, using the result corresponding to the placeholder can be a modification to process 400, causing it to go to block 410 and return the result corresponding to the placeholder, instead of going to block 414. Process 500 can then continue to block 520, where it ends.

If, at block 506, process 500 determines that the received linked list does not have a placeholder item set with a timeframe that encompasses version t, or if, at block 510, process 500 determines that the result of any placeholder process is not indicated as valid at least for version t, process 500 continues to block 514. At block 514, process 500 adds a placeholder item, with a version t, to the received linked list.

At block 516, process 500 determines a result for the invoked f(P) function, for version t. When process 500 is called between blocks 408 and 414, this can be done by resuming execution of process 400 at block 414, and obtaining the result from either block 410 or 434. This is the result that will be passed to any other versions of process 500 waiting at block 508. Process 500 then continues to block 518, where the placeholder item set at block 514 is removed from the linked list. Process 500 then continues to block 520, where it ends.

Figure 6:
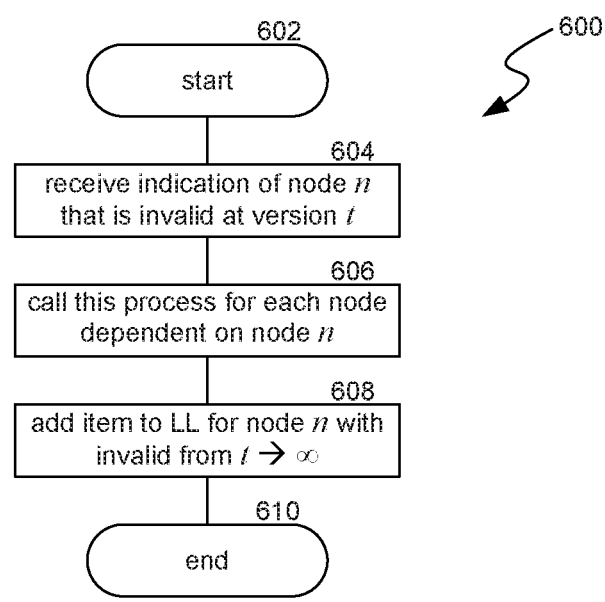
FIG. 6 is a flow diagram illustrating a process used in some implementations for recursively adding invalidity items to the linked lists for nodes in a trace.

FIG. 6 is a flow diagram illustrating a process 600 used in some implementations for recursively adding invalidity items to the linked lists for nodes across a series of dependencies. In some implementations, process 600 can be initiated when source data, corresponding to a node identified in a trace, changes. For example, this can be a change to a global variable or data in a database. Process 600 begins at block 602 and continues to block 604. At block 604, process 600 can receive an indication of a source node (referred to as n) that has been determined to be invalid at a particular data version (referred to as t). When process 600 is initiated as a result of identified source data change, version t can be the version of the data change, e.g. the current version.

At block 606, process 600 can recurse, calling process 600 for each node where a trace edge specifies node n as the source node, using the invocation node for that edge as the new node n in the new call to process 600. In some implementations, process 600 can skip calling a new version of process 604 for nodes that are already in an invalid state for version t, i.e. process 600 may not need to recurse because that node and its ancestor nodes was previously set to invalid for version t.

At block 608, process 600 can add an item to the linked list associated with node n. This new linked list item can indicate that there is no valid stored result for the function corresponding to node n starting at version t and continuing into infinity. Once the entire series of traces is updated, then the version counter can be incremented, making the version with the invalidations "visible." Thus, until this version update, there is no concern that only some nodes have the new changes while others do not, because they can't be "seen" yet. Process 600 can then continue to block 610, where it ends.

Figure 7:
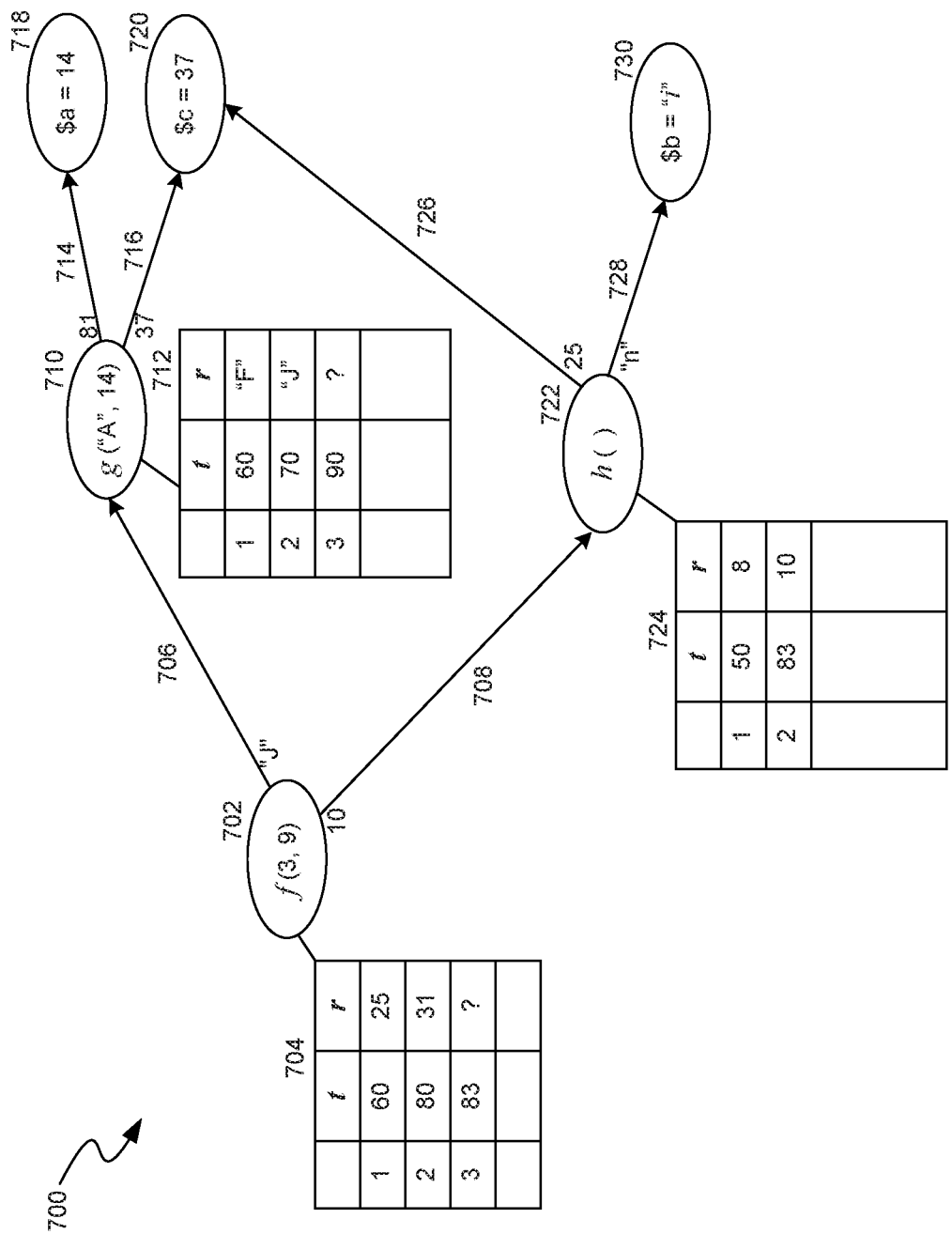
FIG. 7 is a conceptual diagram illustrating an example of a function invocation that checks whether there are valid stored results to use instead of executing the function.

FIG. 7 is a conceptual diagram illustrating an example 700 of a function invocation that checks whether there are valid stored results to use instead of executing the function. Example 700 shows a series of three interdependent traces referring to nodes corresponding to function calls, including node 702 with corresponding linked list 704, node 710 with corresponding linked list 712, and node 722 with corresponding linked list 724. A first trace is the trace for f(3, 9), referring to node 702 as the invocation node, ordered edges 706 and 708 (order not shown) refer to source nodes 710 and 722, respectively. A second trace is the trace for g("A", 14), referring to nodes 710 (the invocation node), 718, and 720, having corresponding ordered edges 714 and 716 (order not shown). A third trace is the trace for h( ), referring to nodes 722 (the invocation node), 720, and 730, with corresponding ordered edges 726 and 728 (order not shown). The edges in each trace show dependencies that are associated with the most recent valid item in each corresponding linked list, i.e. edges 706 and 708 correspond to item 2 from linked list 704, edges 714 and 716 correspond to item 2 of linked lists 712, and edges 726 and 728 corresponding to item 2 of linked lists 724. In example 700, each edge is shown with a corresponding value at the base of the edge indicating the previous value provided from that source data item.

Example 700 can include invocation of f(3, 9) for version t=75. In this case, example 700 can look at the linked list 704 corresponding to the f(3, 9) node 702, and determine that, for the timeframe between 60 and 79, a stored valid result is 25, as indicated by item 1 in linked list 704. Thus, 25 can be returned as a result for the invocation.

Example 700 can further include invocation of f(3, 9) for data version t=85. In this case, example 700 can look at the linked list 704 corresponding to the f(3, 9) node 702, and determine that, for the timeframe between 83 and infinity, linked list 704 does not include a stored valid result, as indicated by item 3 in linked list 704. In response, example 700 can determine that there are stored trace edges for the previous valid result, i.e. edges 706 and 708. Using these trace edges, example 700 can identify nodes 710 and 722. For node 710, example 700 can determine, based on item 2 of linked the 712, that for version t=85, a valid result is "J" for timeframe 70-89. For node 722, example 700 can determine, based on item 2 of linked the 724, that for version t=85, a valid result is "10" for timeframe 83 to infinity. Example 700 can further determine that both the "J" result from node 710 and the "10" result from node 722 are the same as the results that were used to compute item 2 of linked list 704. Example 700 can compute the timeframe overlap for these results, as 83-89. Thus item 3 of linked list 704 can be updated to have t=90, r=?, indicating that the result 31, which was previously valid from time 80-82, is now valid from time 80-89.

Example 700 can further include invocation of f(3, 9) at version t=90. In this case, example 700 can look at the linked list 704 corresponding to the f(3, 9) node 702, and determine that, for the timeframe between 90 (added in the previous portion of this example) and infinity, linked list 704 does not include a stored valid result, as indicated by item 3 in linked list 704. In response, example 700 can determine that there are stored trace edges for the previous valid result, i.e. edges 706 and 708. Using these edges, example 700 can identify nodes 710 and 722, which can be examined in an order defined by the trace. For node 710, example 700 can determine, based on item 3 of linked the 712, that for version t=90, there is no valid stored result for g("A", 14). In response, example 700 can determine that there are stored edges for the previous valid result from item 2 of linked list 712, i.e. edges 714 and 716. Using these edges, example 700 can identify nodes 718 and 720. For node 718, example 700 can determine that this is a source data value for a global variable $a that previously had a value of 81, but currently has a value of 14. Since one of the source data values for g("A", 14) has changed, g("A", 14) for version 90 or above must be re-executed, so the other edge 716 need not be checked. Upon re-execution, g("A", 14) produces a new result "Q" and a new item is added to linked list 712 indicating this result for version 90 → infinity. The "Q" result is also provided in response to the f(3, 9) invocation for version 90. In this instance, the "Q" result is different from the previous "J" result, so f(3, 9) for version 90 or above must be re-executed. Again, the other edge 708 need not be checked. Upon re-executing f(3, 9), the new result is produced and a corresponding new item is added to linked list 704 indicating this result for version 90 → infinity.

In some implementations, storing multiple traces and corresponding linked lists can require significant amounts of storage memory. For example, each linked list item can store vary large data objects as function results. In some cases, the benefit obtained from some of these possible results may be outweighed by the resources necessary to store them. As an optimization, certain data sources (e.g. certain database values) can be determined to be unlikely to change. This determination can be based on factors such as an analysis of various types of data, a log of historical data uses for individual data items or data item types or categories, or a trained classification engine to predict usage times for data items. Where a trace or a sequence of dependent traces that refer to data sources determined to be unlikely to change, the trace(s), referenced nodes, and corresponding linked lists, can be converted to smaller versions that don't store the results for intermediate nodes referenced in the traces.

In some implementations, this conversion can include removing intermediate nodes from being referenced by a sequence of traces. For example, if a sequence of traces includes a( ) → b( ); b( ) → $i; and $i is determined to be unlikely to change, the sequence can be replaced with a( ) → $i and with an indication that intermediate nodes have been removed. The linked list for b( ) can be deleted. However, if $i does change, a( ) may have to be re-executed because actual dependencies are not kept.

In some implementations, the conversion can include simply replacing all the items in the linked list corresponding to intermediate node function invocations with an invalid marker for the timeframe 0 → infinity. For example, if a sequence of traces includes n( ) → p( ); p( ) → $k; and $k is determined to be unlikely to change, the sequence of traces can be kept, but the linked list for p( ) can be cleared and an invalid item with a timeframe 0 → infinity can be added instead. The result will be that, if the result of that intermediate function is needed, it must be re-executed. However, this eliminates the need to store the linked list result values.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for utilizing stored function results, the method comprising:
obtaining an indication of a function invocation with an invocation version value, the invocation version value defining a state of source data used in a function result;
obtaining a data structure corresponding to the function invocation, the data structure specifying multiple timeframes, each of the timeframes being associated with:
a stored valid function result for that timeframe, or
an indication that the timeframe does not contain a stored valid function result;

determining that the invocation version value falls within a first timeframe of the multiple timeframes, wherein the first timeframe corresponds to a particular stored valid function result, and wherein the first timeframe falls before a second of the multiple timeframes that is associated with a particular indication that the second timeframe does not contain a stored valid function result; and in response to determining that the invocation version value falls within the first timeframe, providing, as a result of the function invocation, the particular stored valid function result.

2. The method of claim 1, wherein the data structure is a linked list where at least one of the items in the linked list includes a first version value and a stored function result; and wherein the at least one of the items in the linked list indicates a timeframe, from the first version value until a second version value of a next item in the linked list, in which the stored function result is valid.

3. The method of claim 1, wherein the invocation version value is a value provided by a counter that is incremented upon specified data changes.

4. The method of claim 1, wherein the first timeframe is further associated with a set of one or more dependencies indicating source data that was used to compute the stored valid function result associated with the first timeframe.

5. The method of claim 1, wherein, prior to determining that the invocation version value falls within the first timeframe, the method further comprises:

determining that a timeframe specified by the data structure indicates that the invocation version value is not associated with a stored valid function result;

determining that the data structure includes a placeholder item associated with a version less than the invocation version value; and obtaining a function result corresponding to the placeholder item, wherein the function result corresponding to the placeholder item is associated with a result timeframe that is the first timeframe; and wherein the determining that the invocation version value falls within the first timeframe comprises determining that the invocation version value falls within the result timeframe.

6. A non-transitory computer-readable storage medium storing instructions that, when executed by a computing system, cause the computing system to perform operations for tracking stored function results, the operations comprising:

obtaining an indication of a function invocation with an invocation version value, the invocation version value defining a state of source data used in a function result;

obtaining a trace with edges referring to nodes representing function calls, wherein a referenced invocation node corresponds to the function invocation and is associated with a data structure specifying multiple timeframes, at least one of the timeframes being associated with:

a stored valid function result for that timeframe, or an indication that the timeframe does not contain a stored valid function result;

determining that the invocation version value falls within a particular timeframe of the multiple timeframes, wherein the particular timeframe corresponds to a particular indication that the first timeframe does not contain a stored valid function result;

in response to determining that the invocation time value falls within the particular timeframe:

obtaining, based on the trace, one or more valid source data values the invocation node, corresponding to the function invocation, is dependent on; and determining that each particular source data value, of the valid source data values, has the same value that particular source data value had in relation to a particular stored valid function result associated with a second timeframe prior to the particular timeframe; and providing, as a result of the function invocation, the particular stored valid function result.

7. The non-transitory computer-readable storage medium of claim 6, wherein the obtaining the one or more valid source data values comprises:

determining that a source data value is a function result for which a corresponding source node does not have a valid result for the invocation version value and, in response: invoking the function corresponding to the source node that does not have a valid result; and receiving, as a result, the valid source data value, for the invocation version value, for the source node.

8. The non-transitory computer-readable storage medium of claim 6, wherein each of the one or more valid source data values is associated with a source timeframe; and wherein the operations further comprise:

computing an intersection of the source timeframes; and updating the data structure to include the particular stored valid function result in association with a validity timeframe of the intersection of the source timeframes.

9. The non-transitory computer-readable storage medium of claim 8, wherein the operations further comprise, in response to the determining that the invocation version value falls within the particular timeframe:

determining that the data structure does not include a placeholder item associated with a version lower than the invocation version value; and setting a placeholder item, in the data structure, associated with the invocation version value; and in association with updating the data structure to include the particular stored valid function result, removing or updating the placeholder item from the data structure.

10. The non-transitory computer-readable storage medium of claim 6, wherein the data structure is a linked list where at least one of the items in the linked list includes a first version value and a stored function result; and wherein the at least one of the items in the linked list indicates a timeframe, from the first version value until a second version valued of a next item in the linked list, in which the stored function result is valid.

11. The non-transitory computer-readable storage medium of claim 6, wherein the invocation version value is a value provided by a counter that is incremented upon database data changes.

12. The non-transitory computer-readable storage medium of claim 6, wherein the operations further comprise:

in response to the determining that the invocation version value falls within the particular timeframe:

determining that the data structure includes a placeholder item associated with a version lower than the invocation version value; and obtaining a function result corresponding to the placeholder item, wherein the function result corresponding to the placeholder item is associated with a result timeframe that does not include the invocation version value; and setting a placeholder item, in the data structure, associated with the invocation version value; and in association with updating the data structure to include the particular stored valid function result, removing or updating the placeholder item from the data structure.

13. A system for utilizing stored function results, the system comprising:

one or more processors;

a memory;

an invocation interceptor that obtains an indication of a function invocation with an invocation version value, the invocation version value defining a state of source data used in a function result;

a trace operator that:

obtains a trace with edges referring to nodes representing function calls, wherein an invocation node referenced by one or more edges of the trace corresponds to the function invocation and is associated with a data structure specifying multiple timeframes, at least one of the timeframes being associated with:

a stored valid function result for that timeframe, or an indication that the timeframe does not contain a stored valid function result; and determines that the invocation version value falls within a particular timeframe of the multiple timeframes, wherein the particular timeframe corresponds to a particular indication that the particular timeframe does not contain a stored valid function result; and an invalidity resolver that, in response to the determining that the invocation version value falls within the particular timeframe causes instructions corresponding to the invoked function to be executed, the execution producing a result of the function invocation;

wherein the trace operator further adds, to the data structure, an indication of a second timeframe, wherein the second timeframe covers at least a version associated with the execution, and wherein the second timeframe is associated with the result of the function invocation as a particular stored valid function result for the second timeframe; and wherein the invocation interceptor further provides, as a result of the function invocation, the particular stored valid function result.

14. The system of claim 13, wherein the trace operator further, in response determining that a source data item corresponding to a selected node has changed, adds, to the data structure corresponding the selected node and to the data structure corresponding each of one or more ancestor nodes of the selected node, an indication of a timeframe which does not contain a stored valid function result.

15. The system of claim 13, wherein the data structure is a linked list where at least one of the items in the linked list includes a first version value and a stored function result; and wherein the at least one of the items in the linked list indicates a timeframe, from the first version value until a second version value of a next item in the linked list, in which the stored function result is valid.

16. The system of claim 13, wherein the invocation version value is a value provided by a counter that is incremented at least upon database writes.

17. The system of claim 13, wherein the indication of the function invocation includes an indication of arguments used in the function invocation.

18. The system of claim 13, wherein the causing the instructions corresponding to the invoked function to be executed is further in response to a determination that a least one source data item has a different value from a value computed, for that source data item, during a previous invocation of the function.

19. The system of claim 18, wherein the determination that the a least one source data item has the different value from the previous invocation of the function is based on a stored dependency, between nodes, specified in the trace, the dependency indicating which source data items were used to generate a function result in the previous invocation of the function.

20. The system of claim 19, wherein the stored dependency is further associated with a value indicating at least one previous value that was used to generate the source data items.

* * * * *